Patented May 1, 1945

2,374,917

UNITED STATES PATENT OFFICE 2,374,917

METHOD AND AGENT FOR BREAKING WATER IN OIL EMULSIONS

Sam Leon Bishkin, Houston, Tex., assignor to Standard Oil Development Company, a corporation of Delaware No Drawing. Application July 4, 1942,
Serial No. 449,764

4 Claims. (Cl. 252—333)

The present invention is directed to improvements in breaking emulsions of oil and water, especially the water in oil type and to agents effective for this purpose.

In the production of petroleum, water or brine is frequently produced with the oil. The turbulent flow of the mixture results in the dispersion of water in the form of fine particles throughout the oil to form a more or less permanent emulsion which must be separated before refining. In addition, other oil emulsions, such as tank bottoms and slop oil, accumulate around refineries and must be broken before the oil can be utilized. It is the object of the present invention to provide a novel and efficient process for separating oil eulsions into their component parts.

The novel emulsion breaking agent of the present invention may be described briefly as sulfonated petroleum drying oils and alkali salts of such oils.

It is customary when stabilizing cracked naphtha to treat it with 96% sulfuric acid. The acid reacts with the more reactive components of the cracked naphtha which are precipitated with the sulfuric acid and separated as a sludge. If this sludge is hydrolyzed by dilution with water and heated to decompose the components, the hydrocarbon material may be recovered therefrom. The hydrocarbons recovered comprise a mixture of resins, highly unsaturated drying oils and more volatile components. These drying oils may be separated from the less volatile resins and more volatile hydrocarbons by the well known methods of vacuum distillation and steam distillation.

The drying oil recovered from the treatment as outlined above is characterized by a high iodine number. When spread out in a thin film in the presence of air it dries to a solid film in a manner analogous to vegetable drying oils such as linseed oil.

In accordance with the present invention, drying oils separated from the sludge resulting from the acid treatment of cracked naphtha are sulfonated to produce demulsifying agents. It is preferred to recover the drying oils in the manner above described and then subject the drying oils to the action of a strong sulfonating agent to obtain sulfonic bodies. The sulfonic bodies may be employed as such as emulsion breaking agents, but it is generally preferable to treat the sulfonic bodies to separate out alkali salts thereof and use the alkali salts of the sulfonic bodies as the emulsion breaking material.

It has been found advantageous to carry out the sulfonating step by mixing the petroleum drying oil with chlorosulfonic acid and allowing the mixture to react with the elimination of some HCl to form stable water soluble sulfonic bodies. If desired, fuming or concentrated sulfuric acids may be employed for sulfonating the petroleum drying oils but smaller yields are obtained than when chlorosulfonic acid is used. After the sulfonating step is completed, the addition of alkali salts to the mixture will result in the production of alkali salts of the sulfonic bodies which may be separated by settling.

The recovered sulfonic bodies extracted from the petroleum drying oil or the alkali salts of these sulfonic bodies may be used to break emulsions of oil and water. To the emulsion to be treated is added a relatively small amount of emulsion breaking material, for example one part of the sulfonic bodies to 5,000 parts of emulsion. The precise character of the oil emulsion will, of course, determine the best proportions to be used, more refractory emulsions requiring a greater proportion of the sulfonic bodies, than less refractory emulsions. It will be understood that conventional mechanical treating apparatus and heaters for elevating the temperatures of the emulsions being treated may be employed in accordance with accepted practice.

The characteristics of a typical petroleum drying oil suitable for use as the material to be sulfonated in the preparation of applicant's emulsion breaking agent is shown in the following table. In the table are also given characteristics of vegetable drying oils to show the similarity of the several drying oils:

*Table I*

|  | Petroleum drying oil | Linseed oil (boiled) | Linseed oil (raw) | Tung oil (raw) |
|---|---|---|---|---|
| Gravity, °A. P. I. | 17 | | | |
| Gravity, specific at 60° F. | 0.953 | 0.968 | 0.934 | 0.941 |
| Color, Robinson | 7½ | 3½ | | |
| Drying time, hours | 4-8 | | 24 | |
| Acid number (neutralization value) | 0.07 | 2.8 | 2.0 | 0.2 |
| Sulfur, percent by weight | 1.1 | | | |
| Iodine number | 142 | 133 | 186 | 166 |

As an example of a commercial operation for preparing a drying oil suitable for employment in the production of the emulsion breaking agent of the present invention, a dehydrolyzed sludge obtained by treatment of a cracked naphtha with sulfuric acid was first decarbonized by the use of propane and subsequently distilled to separate a light naphtha fraction, the drying oil and a heavier residue. The drying oil separated by distillation was subsequently contacted with clay to obtain a finished drying oil. The operating conditions employed to obtain the finished drying oil are shown in detail in the following table:

*Table II*

Treating procedure, drying oil: Charge stock—
Cracked naphtha acid sludge, plant hydrolyzed, acid state Decarbonizing conditions:
    Propane-sludge ratio _____ 4:1
    Decarbonizing temperature, °F _____ 120

Atmospheric steam distillation:
    Still temperature, °F. naphtha cut __ 220–520
    Still temperature, °F drying oil cut __ 520–650

Contacting procedure:
    Pounds clay per gallon of decarbonized oil _____ 2.0
    Kind of clay used _____ Milwhite No. 2
    Contacting temperature, °F _____ 300

| Yield data | Based on hydrolyzed sludge (water free) |
|---|---|
| Decarbonizing in propane: Decarbonized oil, percent | 79.4 |
| Atmospheric distillation: | |
|   Naptha, percent | 22.8 |
|   Drying oil distillate | 36.4 |
|   Resin bottoms | 19.5 |
| Contacting: Drying oil (finished), percent | 34.2 |

The sulfonation of this finished drying oil produced stable water-soluble sulfonic bodies which could be used as such for breaking emulsions, or could be converted into alkali salts and these alkali salts of the sulfonic bodies used as emulsion breaking material.

Having fully described the practice of the present invention, what I desire to claim is:

1. The method of preparing an oil emulsion breaking compound which comprises the steps of treating cracked naphtha with sulfuric acid, separating the sludge, hydrolyzing the sludge to recover hydrocarbons therefrom, distilling said hydrocarbons to separate a drying oil fraction and reacting the drying oil fraction with chlorosulfonic acid.

2. The method of preparing an agent suitable for breaking emulsions of oil and water which comprises the steps of treating cracked naphtha with sulfuric acid under conditions to cause the formation of a sludge, separating the sludge, hydrolyzing the sludge to recover hydrocarbons therefrom, and subjecting the recovered hydrocarbons to distillation conditions to separate a drying oil as a distillate fraction and sulfonating the drying oil.

3. A method in accordance with claim 1 in which the sulfonated drying oil fraction is admixed with alkali salts to produce alkali salts of sulfonic bodies.

4. The improvement in the art of treating emulsions of oil and water which comprises adding thereto a water-soluble sulfonated drying oil obtained from the acid sludge of cracked naphtha by hydrolyzing the sludge to recover hydrocarbons therefrom, subjecting said recovered hydrocarbons to distillation conditions to recover as a distillate a drying oil fraction, and subjecting said drying oil fraction to sulfonating conditions to form said water-soluble sulfonated drying oil.

SAM LEON BISHKIN.